United States Patent Office 3,211,913
Patented Oct. 12, 1965

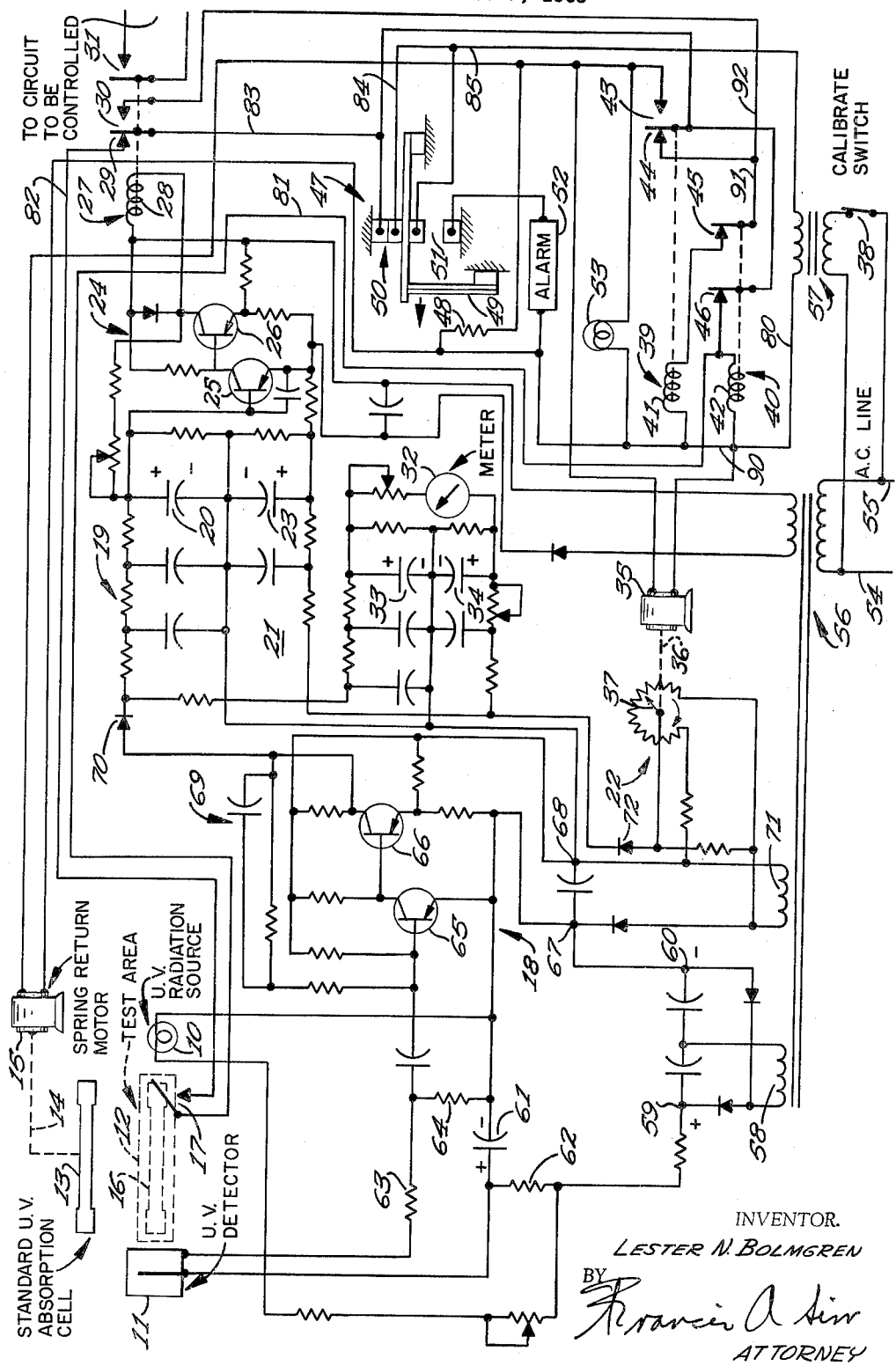

3,211,913
AUTOMATIC CALIBRATION DEVICE FOR PHOTOMETER APPARATUS
Lester N. Bolmgren, Richfield, Minn., assignor to Honeywell Inc., a corporation of Delaware
Filed Nov. 7, 1963, Ser. No. 322,188
8 Claims. (Cl. 250—43.5)

This invention is concerned with a photometer apparatus and particularly with a photometer apparatus having a unique calibrating mechanism.

The disclosed embodiment of my invention consists of a photometer apparatus which is constructed and arranged to provide an output function upon the detection of a specific concentration of hydrocarbon medium, for example, a gas mixture including the hydrocarbon Perchloroethylene. Perchloroethylene, as well as other hydrocarbons, may be harmful if the concentration of these hydrocarbons exceeds a particular value. My invention is of utility in the monitoring of an area to sense the establishment of a particular condition, to sound an alarm or provide a control effect when this condition is reached, and to provide a means to automatically calibrate the operation of the system to a known standard condition. While I have chosen to show a detailed construction of a Perchloroethylene detector, it is not intended that my invention be limited to the detection of this particular medium or detection of a particular concentration of this particular medium or substance.

My invention utilizes a condition detecting means which provides an output signal which is variable with the magnitude of an unkown condition. This output signal is referenced to a normally fixed reference signal and a comparison of the output signal to the reference signal is utilized to provide an output effect. To calibrate the apparatus, I provide a unique structure which is effective to first establish a standard condition, thus giving a standard output signal. The calibration portion of my invention is then effective to reduce the reference signal to a minimum value and then to gradually increase the reference signal until an output effect occurs due to a predetermined relationship being established between the standard output signal and the slowly changing reference signal. The calibration structure is then effective to interrupt a change in the reference signal, establishing a calibrated value for this reference signal, and is further effective to interrupt the establishment of the standard condition.

I further provide an alarm structure whereby a failure of the apparatus to properly calibrate during the timed calibration cycle is effective to energize an alarm or other fault indication output.

My invention will be apparent to those skilled in the art upon reference to the following specification, claims and drawing, of which the single figure is a schematic representation of an embodiment of my invention.

Referring to the single figure, reference numeral 10 designates a radiation source, and particularly a source of ultraviolet radiation. Spaced from the radiation source is detecting means 11 in the form of an ultraviolet sensitive Geiger tube. The space which exists between the members 10 and 11 defines a test area 12. The details of construction of the structure including test area 12 have not been shown for purposes of simplicity. This area may take many forms and may, for example, include a blower which samples the air in a dry cleaning establishment which utilizes Perchloroethylene as a cleaning medium.

Associated with test area 12 is a standard UV absorption cell 13. Cell 13 is shown as displaced from test area 12, cell 13 being held in this position by a mechanical coupling 14 coupling the cell to a spring return motor 15. Energization of motor 15 is effective to lower cell 13 into the dotted line alternate position indicated by reference numeral 16, and to close a switch 17 when the cell is so located in the alternate position.

By way of example, cell 13 may be a glass tube containing a concentration of Perchloroethylene in the range of 40 parts/million. It is within the teachings of this invention to utilize other forms of radiation source and detector and other forms of standard cell, including cells which constitute a standard transmission of radiation as distinguished from an absorption of radiation.

The output of a detecting means including detector 11 is applied to the input of a pulse stretching network identified primarily by means of reference numeral 18. The character output of detector 11 in the form of a Geiger tube, consists of a series of counts or signals of relatively short time duration and of random spacing. The greater the intensity of UV radiation impinging upon detector 11 the greater the count rate is. This count rate in inversely related to the concentration of the Perchloroethylene hydrocarbon at test area 12. In other words, the greater the concentration, the lower the count rate.

Pulse stretcher 18 is utilized to stretch the output count pulse of Geiger tube 11. The output of pulse stretcher 18 is connected to an integrating network 19 whose output exists at a capacitor 20, this capacitor being charged to the polarity indicated and the magnitude of this charge or signal being directly related to the count rate of Geiger tube 11. Thus, as the hydrocarbon concentration in test area 12 increases, the count rate of Geiger tube 11 decreases and the signal at capacitor 20 decreases.

Reference numeral 21 designates generally a reference signal network having an input including a potentiometer 22 and an output at capacitor 23, this ouput being of a normally fixed magnitude and being of the polarity indicated in the drawing.

The output signal at capacitor 20 and the reference signal at capacitor 23 are connected in polarity opposition to the input of an output means identified generally by means of reference numeral 24. Specifically, capacitors 20 and 23 are connected in polarity opposition to the input electrodes of a transistor 25, with transistor 25 connected in controlling relation to the input electrodes of a transistor 26. An output effect is achieved by means of the two states of operation of a relay 27, having a winding 28 connected in circuit with the output electrodes of transistor 26. Relay 27 includes a pair of switches 29 and 30 which are connected in circuit with a calibrating means, the details of which are to be described. A further switch 31 is controlled by the relay 27 and, again for purposes of simplicity, I have indicated that switch 31 is connected to a circuit to be controlled, it being recognized that a great variety of output functions can be achieved with the structure of my invention.

The structure of my invention also includes a meter display output including a meter 32 which is connected to be energized in accordance with the voltage on capacitors 33 and 34. These capacitors respectively correspond to the above described capacitors 20 and 23 in that the voltage on capacitor 33 is indicative of the condition to which Geiger tube 11 is subjected and the voltage on capacitor 34 is a normally fixed magnitude reference voltage, whose magnitude is determined by potentiometer 22.

As I have mentioned, calibration of my apparatus is achieved by a structure which establishes a standard condition, this constituting essentially a standard voltage at capacitor 20. Specifically, this is achieved by means of a network which includes not only motor 15, but a second motor 35, connected by means of mechanical connection 36 to control the position of wiper 37 of a potentiometer 22. Motor 35 is not of the spring return type but is rather a motor, which when deenergized, remains at a stable position. Potentiometer 37 is a rotary type potentiometer capable of a full 360° of rotation, such that upon rotating in a clockwise direction as indicated in the drawing, the potentiometer wiper moves from one end of the resistance element of the potentiometer directly to the other end of the resistance element and continues in its clockwise rotation until motor 35 is deenergized. The calibrating procedure is instituted by means of a switch 38, which, for example, may be a switch adapted to be momentarily open. While I have chosen to show switch 38 as a manual switch, it is within the teaching of this invention to provide a predetermined timed actuation sequence of switch 38, or an actuation of switch 38 which may be related to the occurrence of a particular event, for example, an event associated with a dry cleaning process.

Switch 38 is effective to interrupt the energization of relays 39 and 40, causing the windings 41 and 42 of these relays to become deenergized and the switches 43, 44, 45 and 46 associated with these relays to move from the energized position (as shown) to the deenergized position. Deenergization of relays 39 and 40 is effective to institute energizing of motors 15 and 35 and to begin a timed calibrating cycle, the time of this calibrating cycle being determined by a time delayed safety lockout means 47 in the form of a bimetal timer having actuating heater 48, a bimetal element 49 and switches 50 and 51. Upon failure of the apparatus to properly calibrate within the time period for safety lockout means 47, switch 50 opens and switch 51 closes. The closing of switch 51 energizes an alarm 52 to indicate the inability of the apparatus to properly automatically calibrate to the standard condition.

Operating voltage for the disclosed structure is provided from a pair of power line conductors 54 and 55, adapted to be connected to a source of alternating voltage, not shown. A transformer 56, whose primary winding is connected to conductors 54 and 55 supplies energizing voltage to the detection portion of my apparatus, whereas a transformer 57 supplies operating voltage to the calibrating network.

A secondary winding 58 of transformer 56, along with an associated rectifying network provides a source of D.C. operating voltage with a positive terminal 59 and a negative terminal 60. The voltage between terminals 59 and 60 is effective to charge a capacitor 61 through a high impedance resistor 62 to supply operating voltage to the electrodes of Geiger tube 11 by means of a series circuit which includes resistors 63 and 64. Also, the voltage source 59–60 is connected to energize UV radiation source 10. Preferably, source 59–60 is a regulated source. For purposes of simplicity, I have not shown the regulating structure.

The output of Geiger tube 11, at which a count voltage is provided, consists of resistor 64 which is capacitance coupled to the input electrodes of a transistor 65. Transistor 65 is connected in controlling relation to a second transistor 66 and the electronic network including these transistors and related components receives its operating voltage from a source having positive terminal 67 and negative terminal 68. The construction of the electronic network including transistors 65 and 66 is such as to cause transistor 65 to be normally conductive and thus establish a normal non-conducting position for transistor 66. The presence of count voltage at resistor 64, causes the upper terminal of this resistor to be positive with respect to the lower terminal and renders transistor 65 non-conductive and thus switches transistor 66 to a state of conduction. An R-C network 69 is connected from an output electrode of transistor 66 to an input electrode of transistor 65 and then timing achieved by structure 69 is effective to cause the pulse stretching network to remain in a state of operation wherein transistor 66 is conductive for a given length of time thus accomplishing a pulse stretching effect.

The output of pulse stretcher 18 is connected through a diode 70 to the input of a pair of integrating R-C networks to charge the capacitors 20 and 33 respectively. Thus, a count voltage indicative of the condition to which Geiger tube 11 is subjected is established at capacitors 20 and 33.

Secondary winding 71 of transformer 56 is connected through a network including a diode 72 and including potentiometer 22 to charge capacitors 23 and 34 respectively to the voltage polarity indicated. This voltage is a reference voltage and is of a normally fixed magnitude.

With respect to capacitors 33 and 34, these capacitors are connected in series opposing relationship to energize a meter display 32. This meter may, for example, be a null type meter, reading from 0 to 100 parts/million of Perchloroethylene concentration.

With regard to capacitors 20 and 23, these capacitors are connected in series opposition to the input electrodes of transistor 25. The connection of these capacitors to the input electrodes of transistor 25 is such that the voltage on capacitor 20 tends to maintain transistor 25 non-conductive thus maintaining transistor 26, and maintaining relay 25 energized, as shown. A relative decrease in voltage at capacitor 20, indicative of a reduced count rate and thus a higher concentration of Perchloroethylene, is effective, when a given Perchloroethylene concentration is achieved, to allow the voltage on capacitor 23 render transistor 25 conductive, thus rendering transistor 26 non-conductive and deenergizing relay 27 to close switch 31 and to actuate an output circuit, for example, vent fans to increase air circulation in the area which a high concentration of Perchloroethylene has accumulated.

Thus far, I have described the operation of my apparatus wherein the apparatus continually monitors test area 12 and effects a deenergization of relay 27 only when an unduly high concentration of Perchloroethylene occurs at the test area. As will be readily appreciated, the apparatus may function for long periods of time without experiencing a condition requiring deenergization of relay 27. During this period of operation a great many operating conditions may change disturbing the calibration of the apparatus. For example, the radiation source 10 and the detector 11 have operating characteristics which change with age of the device. Furthermore, dust and the like may accumulate on these components to somewhat change the characteristics.

In order to overcome changes in operation resulting from conditions such as above mentioned, switch 38 is momentarily opened to deenergize relays 39 and 40. The deenergization of relay 39 is effective to close switch 43 and establish energizing circuits for motor 35, motor 15, and the heater 48 of lockout means 47. The circuits for these elements include the normally closed switch 50 of lockout means 47, this switch normally being closed at this time.

Energization of motor 15 is effective to lower the stadard UV absorption cell 13 in the alternate position by means of the broken line 16. With this cell in the alternate position, the voltage provided at capacitor 20 assumes a value as determined by the detection of a standard condition established by the presence of the cell in test area 12.

Energization of motor 35 is effective to cause rotation of the wiper 37 of potentiometer 22 in a clockwise direction. With initial clockwise movement of wiper 37, the reference voltage at potentiometer 22 is increased in magnitude. The effect of the presence of cell 13 within test area 12 and the effect of increase of the reference voltage at capacitor 23 is effective to switch transistor 25 to a state of conduction and to thus render transistor 26 non-conductive, deenergizing relay 27.

As potentiometer wiper 37 continues to be driven in a clockwise direction, the wiper moves off of the high voltage end of the potentiometer resistance elements and engages the low potential end of the resistance element. This operation effects a sudden decrease in the magnitude of the reference voltage at capacitor 23. This decrease in voltage, when compared to the now standard count voltage at capacitor 20 will effect an increase in the count voltage and this relative increase in count voltage causes transistor 25 to be rendered non-conductive. Transistor 26 is then switched to a conductive state and relay 27 is again energized. Energization of relay 27 is effective to energize relay 40 associated with the calibrating network. The energizing circuit for relay 40 can be traced from the left hand terminal of the secondary winding of transformer 57, through conductor 80, winding 42, conductor 81, switch 17, conductor 82, switch 29, conductor 83, switch 50 and conductors 84 and 85 to the right hand terminal of this secondary winding.

The energization of the winding of relay 40 is effective to cause switches 45 and 46 to close. Switch 46 is a holding switch connecting winding 42 through switch 46 and through switch 50 of safety lockout means 47 to the right hand terminal of the transformer secondary winding.

Switch 45, which is closed by energization of relay 40, completes a portion of a circuit adapted to later energize relay 39.

The wiper 37 of potentiometer 22 continues to rotate in a clockwise direction and as this rotation progresses, the magnitude of the reference voltage present at capacitor 23 is gradually increased, this amounting to a relative reduction in the count voltage at capacitor 20 as this voltage is compared to the voltage at capacitor 23 by the input of network 24. A position of wiper 37 is established wherein the reference voltage at capacitor 23 is effective to switch transistor 25 to a state of conduction, thereby rendering transistor 26 non-conductive and deenergizing relay 27. This deenergization of relay 27 causes switch 30 to close and completes an energizing circuit for relay 39. This energizing circuit can be traced from the left hand terminal of the secondary winding of transformer 57 through conductors 80 and 90, winding 41, switch 45, conductors 91 and 92, switch 30, conductor 83, switch 50, and conductors 84 and 85 to the right hand terminal of the secondary winding. This circuit is effective to energize the winding of relay 39, causing switch 43 to open and switch 43 to close.

The opening of switch 43 is effective to immediately deenergize motor 35, motor 15 and heater 48. The closing of switch 44 establishes a holding circuit for the winding of relay 39 in which switches 45, 44 and 50 are connected in series, connecting the relay winding to the secondary of transformer 57.

Deenergizing of motor 35 is effective to interrupt rotation of wiper 37, thus establishing a new calibrated position of this wiper. At this calibrated position, the voltage at capacitor 23, a reference voltage, has been calibrated to the standard condition established at test area 12 by the presence of cell 13 in which deenergization of motor 15 is effective to cause cell 13 to move out of the alternate position to the full line position shown in the drawing, thus again subjecting detector 11 to a condition to be monitored. Relay 27 is thus again controlled in accordance with the magnitude of this condition.

It will be remembered that heater 48 of safety lockout means 47 also energizes during the entire calibrating procedure. In the event that motor 35 had been unable to establish a calibration portion at capacitor 23, the relay 27 would not have been deenergized and as a result, safety lockout means 47, after a time period of energization of heater 48, would have been effective to actuate its switches, opening switch 50 and closing switch 51. The closing of switch 51 is effective to energize an alarm 52 to indicate the inability of the apparatus to calibrate itself.

From the above description it can be seen that I have provided a unique photometer apparatus in which a variable condition signal is compared to a reference signal to provide an output effect and in which a calibration network is effective to establish a standard condition signal against which the reference signal may be calibrated to achieve a convenient and automatic recalibration of my apparatus assuring predictable and constant output results. Modifications of my invention will be apparent to those skilled in the art and it is thus intended that the scope of my invention be limited solely to the appended claims.

I claim as my invention:

1. Photometer apparatus for use in monitoring the radiation transmission properties of a test area, comprising:

a radiation source and a radiation detector spaced apart to define the test area, the radiation impinging upon said detector being a function of the radiation transmission properties of the medium occupying the test area, first means controlled by said detector to provide a detection signal whose magnitude varies with the radiation impinging upon said detector, second means to provide a reference signal, output means controlled by said first and second means and having an output relay, said output relay having a first state of operation indicative of a range of radiation transmission properties which is below a given level and having a second state of operation indicative of a range of radiation transmission properties which is equal to or above the given level, calibrating means selectively operable to place a medium having said given level of radiation transmission properties in the test area to thereby cause said detection signal to change to a standard magnitude, means including said calibrating means controlling said second means to variably adjust the magnitude of said reference signal to first reduce the magnitude of said reference signal and to then increase the magnitude of said reference signal, thereby causing said relay to be initially actuated to said first state and then to be actuated to said second state, and means controlled by said relay upon actuation of said relay to said first state and upon subsequent actuation to said second state to interrupt adjustment of said reference signal and to remove said medium of said given level of radiation transmission properties from said test area.

2. In combination;

condition sensing means having a condition detector adapted to be subjected to a variable physical condition to provide a variable magnitude condition signal indicative of the physical condition, reference means providing a normally fixed magnitude reference signal, signal responsive output means connected to compare the magnitude of said condition signal to the magnitude of said reference signal and having an output relay, said output relay having a first state of operation indicative of a physical condition of which is below a given value and having a second state of operation indicative of a physical condition which is above a given value, selectively operable means effective to institute a calibration cycle to calibrate the magnitude of said reference signal to a physical condition of said given value, means controlled by said selectively operable means to institute a physical condition of said given value to provide a standard magnitude condition signal, means controlled by said selectively operable means to control said reference means and to provide a timed change in the magnitude of said reference signal from a low magnitude toward a high magnitude to first cause said relay to assume said first state of operation and to thereafter cause said relay to assume said second state of operation, and means controlled by said selectively operable means and responsive to said relay assuming said first state of operation and subsequently assuming said second state of operation to interrupt the change in magnitude of said reference signal and to again subject said detector to the variable physical condition.

3. In combination with an ultraviolet absorption photometer having a source of ultraviolet radiation which is spaced from ultraviolet detector means to define a test area into which an unknown substance is to be introduced, the detector means providing an output signal of a magnitude which decreases as the ultraviolet absorption characteristics of the substance within the test area increases;

reference means having an output signal of a normally fixed magnitude, signal comparsion means having input means connected to the detector means and to said reference means to compare the magnitude of the detector means output signal and the magnitude of the reference means output signal, output relay means controlled by said signal comparison means hnd having a first state of operation indicative of a range of ultraviolet absorption which is below a given value and having a second state of operation indicative of a range of ultraviolet absorption which is above the given value, calibrating means adapted to adjust the magnitude of the reference means output signal and effective when actuated to introduce a substance of said given value of ultraviolet absorption characteristic within the test area and to control said reference means to first decrease and then to increase the magnitude of the reference means output signal, and means responsive to said output relay means first assuming said first state of operation as the magnitude of the reference means output signal is decreased and then assuming said second state of operation as the magnitude of the reference means output signal increases to interrupt control of said reference means by said calibrating means.

4. An ultraviolet absorption photometer, comprising;

a source of ultraviolet radiation and an ultraviolet sensitive Geiger tube spaced apart to define a test area, the count rate of said Geiger tube bearing an inverse relationship to the ultraviolet absorption properties of a medium in said test area, integrating means connected to said Geiger tube and providing a detection voltage whose magnitude bears a direct relationship to the count rate of said Geiger tube, reference means providing a reference voltage of a normally fixed magnitude which is related to a standard condition of ultraviolet absorption, output means having an input connected to compare the magnitude of said detection voltage to the magnitude of said reference voltage as a measure of the ultraviolet absorption of the medium in said test area and an output relay having a first or a second state of operation as the ultraviolet absorption properties of the medium in the test area is less than or greater than the standard condition of ultraviolet absorption respectively, and selectively operable calibrating means to institute an calibrating cycle of operation to calibrate the magnitude of said reference voltage to the standard condition, said calibrating means including a standard medium of said standard condition of ultraviolet absorption properties and means to position said standard medium at said test area, including means to vary the magnitude of said reference voltage from a low value to progressively increasing values and including means controlled by said output relay upon said relay assuming said first state and then assuming said second state to remove said standard medium from said test area and to interrupt the variation in the magnitude of said reference voltage.

5. An ultraviolet absorption photometer, comprising;

a source of ultraviolet radiation and a radiation sensitive detector responsive to ultraviolet radiation, said source and said detector being spaced from each other to define a test area into which an unknown substance is to be admitted, first circuit means connected to be controlled by said detector and to provide an output signal whose magnitude is indicative of the ultraviolet absorption characteristics of the substance, second circuit means having an output reference signal of a normally fixed magnitude and having a controllable element effective to control the magnitude of said reference signal, comparison means having an input connected to be controlled by the outputs of said first and second circuit means and having an output including an output relay, said output relay having a first state of operation indicative of a range of ultraviolet absorption which is below a given value and having a second state of operation indicative of a range of ultraviolet absorption which is equal to or above the given value, checking means effective to move a standard substance into said test area to produce a standard ultraviolet absorption of said given value, means including said checking means effective to control the controllable element of said second circuit means to cause the output relay of said comparison means to assume said first state of operation while said standard substance is in said test area and to subsequently increase the magnitude of said reference signal to cause the output relay of said comparison means to assume said second state of operation, and means responsive to the output relay of said comparison means assuming said second state of operation to interrupt the control of the controllable element of said second circuit means to thereby establish a reference signal of a magnitude related to the standard ultraviolet absorption.

6. In combination:

a source of radiation,

Geiger tube means spaced from said source of radiation to define a test area therebetween, the count rate of said Geiger tube means being a measure of the radiation transmission properties of the medium occupying said test area, integrating means connected to said Geiger tube means to provide a D.C. count voltage whose magnitude increases as said count rate increases, reference means to provide a normally fixed magnitude D.C. reference voltage, an output circuit having input means and having output switch means having a first and a second condition of operation, means connecting said count voltage and said reference voltage in polarity opposition to the input means of said output circuit in a manner to cause said output switch means to assume said first condition of operation so long as the magnitude of said count voltage is above a given magnitude as determined by the magnitude of said reference voltage, and to assume said second condition of operation so long as the magnitude of said count voltage is below said given magnitude, and selectively operable calibrating means operable when actuated to calibrate said normally fixed magnitude of said reference voltage to a standard, said calibrating means including a standard medium of known radiation transmission properties, means operable upon actuation of said calibrating means to move said standard medium into said test area to establish a standard count voltage, means operable upon actuation of said calibrating means to reduce the magnitude of said reference voltage to cause said output switch means to assume said first condition of operation in response to said standard count voltage, said last named means then being operable to progressively increase the magnitude of said reference voltage to cause said output switch means to assume said second condition of operation when the magnitude of said reference voltage bears a predetermined relation to said standard count voltage, and means operable upon said output switch means assuming said second condition of operation to move said standard medium out of said test area and to interrupt the change in magnitude of said reference voltage.

7. In an ultraviolet absorption photometer having a source of ultraviolet radiation which is spaced from a Geiger tube ultraviolet detector to define a test area into which an unknown concentration of hydrocarbon gas is to be introduced, the Geiger tube providing a D.C. count voltage which decreases in magnitude as the hydrocarbon concentration increases, a source of D.C. reference voltage whose magnitude is determined by the position of the wiper of a potentiometer, comparison means effective to compare the count voltage to the reference voltage and having an output relay, said output relay having a first state indicative of a range of ultraviolet absorption which is below a given value and having a second state indicative of a range of ultraviolet absorption which is equal to or above the given value, calibrating means effective to calibrate the magnitude of the reference voltage to a known hydrocarbon concentration, means effective upon actuation of said calibrating means to place a hydrocarbon gas of said given value of ultraviolet absorption in the test area to cause the magnitude of the count voltage to assume a calibration value, motor means coupled to said potentiometer wiper and effective upon actuation of said calibrating means to institute a timed variation of the magnitude of the reference voltage from a minimum value to a maximum value, said comparison means being effective to provide said first state of said output relay in response to a comparison of the calibration value of the count voltage to a minimum value of said reference voltage and to subsequently provide said second state of said output relay as the magnitude of said reference voltage increases to said given value, and means effective upon actuation of said calibrating means and responsive to the presence of said first state of said output relay and the subsequent second state of said output relay to remove said hydrocarbon gas from the test area and to interrupt operation of said motor means.

8. In combination;

a source of radiation, radiation sensitive means spaced from said source of radiation to define a test area therebetween, the output of said radiation sensitive means being a measure of the radiation transmission properties of the medium occupying said test area, means connected to said radiation sensitive means to provide a D.C. condition voltage whose magnitude increases as the radiation transmission property of the medium increases, reference means to provide a normally fixed magnitude D.C. reference voltage, an output circuit having input means and having output switch means having a first and a second condition of operation, means connecting said condition voltage and said reference voltage in polarity opposition to the input means of said output circuit in a manner to cause said output switch means to assume said first condition of operation so long as the magnitude of said condition voltage is above a given magnitude as determined by the magnitude of said reference voltage, and to assume said second condition of operation so long as the magnitude of said condition voltage is below said given magnitude, and selectively operable calibrating means operable when actuated to calibrate said given magnitude of said reference voltage to a standard, said calibrating means including a standard medium of known radiation transmission properties, means operable upon actuation of said calibrating means to move said standard medium into said test area to establish said given magnitude condition voltage, means operable upon actuation of said calibrating means to reduce the magnitude of said reference voltage to cause said output switch means to assume said first condition of operation in response to said given magnitude condition voltage, said last named means then being operable to progressively increase the magnitude of said reference voltage to cause said output switch means to assume said second condition of operation when the magnitude of said reference voltage bears a predetermined relation to said given magnitude condition voltage, means operable upon said output switch means assuming said second condition of operation to move said standard medium out of said test area and to interrupt the change in magnitude of said reference voltage, and fault indication means responsive to failure of said output switch means assuming said second condition of operation.

References Cited by the Examiner
UNITED STATES PATENTS

| 2,874,298 | 2/59 | Kindred | 250—43.5 |
| 2,939,953 | 6/60 | Parsons et al. | 250—43.5 |
| 2,951,161 | 8/60 | Foster et al. | 250—83.3 |

RALPH G. NILSON, *Primary Examiner.*